United States Patent [19]

Kusakabe et al.

[11] Patent Number: 5,852,129
[45] Date of Patent: Dec. 22, 1998

[54] METHOD FOR PRODUCING HYDROXYL-TERMINATED (METH) ACRYLIC POLYMER

[75] Inventors: Masato Kusakabe; Kenichi Kitano; Yoshiki Nakagawa, all of Kobe, Japan

[73] Assignee: Kaneka Corporation, Osaka, Japan

[21] Appl. No.: 980,407

[22] Filed: Nov. 28, 1997

[30] Foreign Application Priority Data

Nov. 28, 1996 [JP] Japan ..................................... 8-317195
Jul. 10, 1997 [JP] Japan ..................................... 9-184684

[51] Int. Cl.$^6$ .............................. C08F 20/10; C08F 2/46
[52] U.S. Cl. ..................... 525/330.3; 528/12; 528/14; 528/25; 528/220; 528/246; 528/271; 525/55; 525/153; 525/154; 525/190; 525/326.1; 525/329.7; 525/330.2; 525/339; 525/451; 522/6; 522/27; 522/30; 522/66; 522/67; 522/71; 522/74; 522/81
[58] Field of Search ................................... 528/12, 14, 25, 528/220, 246, 271; 525/55, 153, 154, 190, 326.1, 329.7, 330.2, 330.3, 339, 451; 522/6, 27, 30, 66, 67, 71, 74, 81, 82, 94

[56] References Cited

U.S. PATENT DOCUMENTS

| | | |
|---|---|---|
| 3,833,384 | 9/1974 | Noonan et al. . |
| 5,006,434 | 4/1991 | Blanchet-Fincher et al. ............. 430/49 |
| 5,120,629 | 6/1992 | Bauer et al. ............................... 430/70 |
| 5,145,760 | 9/1992 | Blanchet-Fincher et al. ............. 430/73 |
| 5,536,620 | 7/1996 | Dueber et al. ........................ 430/284.1 |
| 5,620,177 | 4/1997 | Takemoto et al. ....................... 271/176 |
| 5,643,657 | 7/1997 | Dueber et al. ........................... 428/209 |
| 5,728,505 | 3/1998 | Dueber et al. ........................ 430/271.1 |

FOREIGN PATENT DOCUMENTS

| | | |
|---|---|---|
| 1-19402 | 4/1989 | Japan . |
| 4-132706 | 5/1992 | Japan . |
| 5-262808 | 10/1993 | Japan . |

OTHER PUBLICATIONS

*Macromolecules* 1995, 28, 7901–7910.
*Macromolecules* 1995, 28, 1721–1723.
*J. Am. Chem. Soc.* 1995, 117, 5614–5615.
*Science* vol. 272, May 10, 1996, 866–868.

*Primary Examiner*—Samuel A. Acquah
*Attorney, Agent, or Firm*—Pollock, Vande Sande & Amernick

[57] ABSTRACT

A method for producing a hydroxyl-terminated (meth) acrylic polymer which comprises converting a halogen atom in a terminal structure of the general formula (1)

$$-CH_2-C(R^1)(CO_2R^2)(X) \qquad (1)$$

wherein $R^1$ is hydrogen or methyl, $R^2$ is alkyl containing 1 to 20 carbon atoms, aryl containing 6 to 20 carbon atoms or aralkyl containing 7 to 20 carbon atoms, and X is chlorine, bromine or iodine, of a (meth)acrylic polymer obtained by polymerizing a (meth)acrylic monomer using an organic halide or a halogenated sulfonyl compound as an initiator and, as a catalyst, a metal complex with a central metal selected from the elements belonging to the groups 8, 9, 10 and 11 in the periodic table, into a hydroxyl-containing substituent.

The present invention can provide, in an easy and simple manner, a (meth)acrylic polymer which is hydroxyl-terminated at both ends in a high proportion and which has been difficult to produce in the prior art. It can give a cured product with good curing characteristics.

21 Claims, No Drawings

METHOD FOR PRODUCING HYDROXYL-TERMINATED (METH) ACRYLIC POLYMER

FIELD OF THE INVENTION

The present invention relates to a method for producing a hydroxyl-terminated (meth)acrylic polymer, a curable composition containing said polymer, a method for producing an alkenyl- or crosslinkable silyl-terminated polymer, which is derived from said polymer, and a curable composition comprising said alkenyl- or crosslinking silyl-terminated polymer as a main component.

BACKGROUND OF THE INVENTION

It is known that hydroxyl-terminated polymers, when crosslinked by using a compound having a functional group reactive with a hydroxyl group, for example an isocyanate compound, as a curing agent, give cured products excellent in heat resistance and durability, among others.

The principal chain skeleton of such hydroxyl-terminated polymers includes, among others, polyether polymers such as polyethylene oxide, polypropylene oxide and polytetramethylene oxide; hydrocarbon polymers such as polybutadiene, polyisoprene, polychloroprene, polyisobutylene and hydrogenation products thereof; and polyester polymers such as polyethylene terephthalate, polybutylene terephthalate and polycaprolactone. According to their principal chain skeleton and crosslinking manner, they are used for various applications.

Unlike the above-mentioned polymers, which are obtainable by ionic polymerization or condensation polymerization, hydroxyl-terminated vinyl polymers obtained by radial polymerization have scarcely been put into practical use. Among vinyl polymers, (meth)acrylic polymers have those characteristics which can hardly be attained by the above-mentioned polyether polymers., hydrocarbon polymers or polyester polymers, for example high weather resistance and transparency. Ones having hydroxyl groups at the side chains are used in weather-resistant paints, for instance.

(Meth)acrylic polymers having hydroxyl groups at the chain ends, if obtained in a simple and easy manner, will be able to give cured products improved in physical properties such as elasticity compared with ones having hydroxyl groups at the side chains. Therefore, a number of investigators have so far tried to establish production processes therefor. However, it is not easy to produce them on a commercial scale.

Japanese Kokai Publication Hei-05-262808 discloses a method for synthesizing (meth)acrylic polymers having a hydroxyl group at each terminus by using a hydroxyl-containing disulfide as a chain transfer agent. For securing hydroxyl groups introduction into both ends, however, this method requires use of the chain transfer agent in a large amount relative to an initiator. This poses a problem from the viewpoint of production step. In addition, Japanese Kokoku Publication Hei-01-19402 discloses a method for producing hydroxyl-terminated (meth)acrylic polymers by using hydrogen peroxide as an initiator. It is difficult, however, to secure hydroxyl groups introduction into both ends. Thus, a method actually employed consists in copolymerization with a hydroxyl-containing vinyl monomer (e.g. 2-hydroxyethyl methacrylate). Moreover, Japanese Kokai Publication Hei-04-132706 discloses a method for producing a hydroxyl-terminated vinyl polymer which comprises preparing a halogen-terminated (meth)acrylic polymer by polymerizing a (meth)acrylic monomer using a telogen such as carbon tetrachloride and then substituting the terminal halogen by reacting with a nucleophile such as a diol compound, hydroxyl-containing carboxylic acid or hydroxyl-containing amine. By this method, too, it is difficult to introduce a functional group into both termini at high ratios, since the chain transfer of the telogen is not sufficient.

Accordingly, it is an object of the present invention to provide a method for producing a (meth)acrylic polymer which contains terminal hydroxyl groups in a higher proportion as compared with the prior art methods, as well as a curable composition containing the same as a main component thereof. Another object of the invention is to provide a method for further introducing another functional group (e.g. alkenyl, crosslinkable silyl) by making use of the reactivity of the terminal hydroxyl groups, as well as a curable composition containing the same.

SUMMARY OF THE INVENTION

As one of the objects mentioned above, the hydroxyl-terminated (meth)acrylic polymer can be produced by converting a halogen atom in a terminal structure of the general formula (1):

$$—CH_2—C(R^1)(CO_2R^2)(X) \qquad (1)$$

(wherein $R^1$ is hydrogen or methyl, $R^2$ is alkyl containing 1 to 20 carbon atoms, aryl containing 6 to 20 carbon atoms or aralkyl containing 7 to 20 carbon atoms, and X is chlorine, bromine or iodine), of a (meth)acrylic polymer obtained by polymerizing a (meth)acrylic monomer using an organic halide or a halogenated sulfonyl compound as an initiator and, as a catalyst, a metal complex with a central metal selected from the elements belonging to the groups 8, 9, 10 and 11 in the periodic table, into a hydroxyl-containing substituent.

As specific examples of such production method, there may be mentioned a method comprising producing the (meth)acrylic polymer having a terminal structure of the general formula (1) by polymerizing a (meth)acrylic monomer using an organic halide or a halogenated sulfonyl compound as an initiator and, as a catalyst, a metal complex with a central metal selected from the elements belonging to the groups 8, 9, 10 or 11 in the periodic table, and further reacting said polymer with a compound having a polymerizable alkenyl group and a hydroxyl group; a method comprising reacting the (meth)acrylic polymer having a terminal structure of the general formula (1) with an elemental metal or an organometallic compound to prepare an enolate anion, and then treating with an aldehyde or a ketone; or a method comprising reacting said starting polymer with a hydroxyl-containing oxy anion or a hydroxyl-containing carboxylate anion.

The said polymer can also be produced by preparing a (meth)acrylic polymer having a hydroxyl group at one end and a structure of general formula (1) at the other end by polymerizing a (meth)acrylic monomer using a hydroxyl-containing halide as an initiator and, as a catalyst, a metal complex with a central metal selected from the elements belonging to the groups 8, 9, 10 or 11 in the periodic table, and further converting the halogen to a hydroxyl-containing substituent.

The said polymer can further be produced by preparing a (meth)acrylic polymer having a hydroxyl group at one end and a structure of the general formula (1) at the other end by the said polymerization using a hydroxyl-containing halide as an initiator, and further subjecting the same to coupling reaction between the terminal halogens in the general formula (1) through a compound having at least two identical or different functional groups each capable of substituting the terminal halogen.

A curable composition of the present invention comprises two components: (A) a hydroxyl-terminated (meth)acrylic polymer; and (B) a compound having at least two functional groups each capable of reacting with a hydroxyl group.

According to the present invention, an alkenyl-terminated (meth)acrylic polymer can be produced by converting the terminal hydroxyl group of the hydroxyl-terminated (meth)acrylic polymer obtained by the above methods into an alkenyl-containing substituent. A curable composition based on the alkenyl-terminated (meth)acrylic polymer obtained by this method comprises two components: (C) the alkenyl-terminated (meth)acrylic polymer; and (D) a hydrosilyl-containing compound.

Furthermore, according to the invention, a crosslinkable silyl-terminated (meth)acrylic polymer can be produced by subjecting the alkenyl-terminated (meth)acrylic polymer to addition reaction with a crosslinkable silyl-containing hydrosilane compound, or by reacting the hydroxyl-terminated (meth)acrylic polymer obtained by the above methods with a compound containing a crosslinkable silyl group and a functional group reactive with a hydroxyl group. Another curable composition can further be obtained based on the thus-obtained, crosslinkable silyl-terminated (meth) acrylic polymer.

The hydroxyl-terminated (meth)acrylic polymer obtained in accordance with the present invention is further characterized in that it shows narrow molecular weight distribution.

DETAILED DESCRIPTION OF THE INVENTION

A method for producing a hydroxyl-terminated (meth) acrylic polymer according to the present invention is characterized in that a halogen atom in a terminal structure of the general formula (1)

(wherein $R^1$ is hydrogen or methyl, $R^2$ is alkyl containing 1 to 20 carbon atoms, aryl containing 6 to 20 carbon atoms or aralkyl containing 7 to 20 carbon atoms, and X is chlorine, bromine or iodine), of a (meth)acrylic polymer obtained by polymerizing a (meth)acrylic monomer using an organic halide or a halogenated sulfonyl compound as an initiator and, as a catalyst, a metal complex with a central metal selected from the elements belonging to the groups 8, 9, 10 and 11 in the periodic table, is converted into a hydroxyl-containing substituent.

As the prior art methods for producing halogen-terminated (meth)acrylic polymers, have been adopted, for example, polymerization using a halide, such as carbon tetrachloride, carbon tetrabromide, methylene chloride and methylene bromide, as a chain transfer agent (telogen). By this methods, however, it is difficult to secure halogen atoms introduction into both termini.

On the contrary, living radical polymerization technique, which has recently become a target of wider and deeper study, enables terminal halogens introduction in a high proportion (see, for example, Matyjaszewski et al., J. Am. Chem. Soc., 1995, 117, 5614, Macromolecules, 1995, 28, 7901, Science, 1996, 272, 866; Sawamoto et al., Macromolecules, 1995, 28, 1721). Despite radical polymerization, it proceeds in a living manner, giving a polymer with narrow molecular weight distribution (Mw/Mn=1.1 to 1.5), and its molecular weight can be controlled at will by selecting a monomer/initiator ratio.

The initiator used in this living radical polymerization is an organic halide, in particular an organic halide having a highly reactive carbon-halogen bond (e.g. a carbonyl compound having a halogen in a -position, or a compound having a halogen in the benzyl position), or a halogenated sulfonyl compound.

For producing the crosslinkable (meth)acrylic polymers by this polymerization technique, an organic halide or halogenated sulfonyl compound having two or more initiation sites is used as an initiator. Specific examples are:

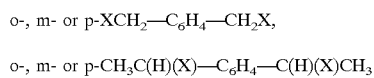

and

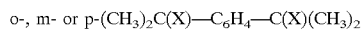

(wherein $C_6H_4$ represents phenylene and X represents chlorine, bromine or iodine);

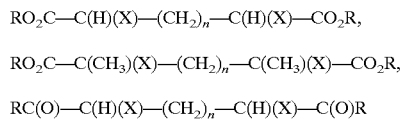

and

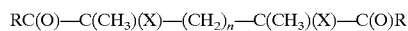

(wherein R represents alkyl, aryl or aralkyl containing up to 20 carbon atoms, n represents an integer of 0 to 20 and X represents chlorine, bromine or iodine);

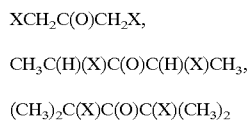

and

(wherein X represents chlorine, bromine or iodine and n represents an integer of 0 to 20);

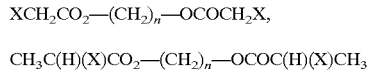

and

(wherein X represents chlorine, bromine or iodine and n represents an integer of 1 to 20); and

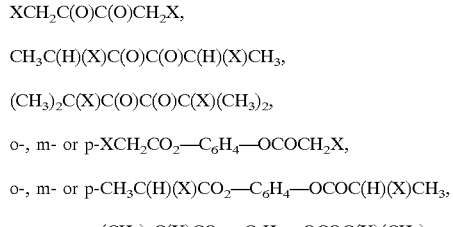

and

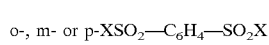

(wherein X represents chlorine, bromine or iodine).

The catalyst used herein is a metal complex with a central metal selected from the elements belonging to the groups 8, 9, 10 and 11 in the periodic table. Particularly suited metal species are univalent copper, divalent ruthenium, divalent iron and divalent nickel. Specific examples are cuprous chloride, cuprous bromide, cuprous iodide, cuprous cyanide, cuprous oxide, cuprous acetate, cuprous perchlorate, etc. In cases where a copper compound is used, a ligand, for example 2,2'-bipyridyl or a derivative thereof, 1,10-phenanthroline or a derivative thereof, is effectively added so that catalyst activity can be increased. The tristriphenylphosphine complex of divalent ruthenium chloride (RuCl$_2$(PPh$_3$)$_3$) is also suited as the catalyst. When a ruthenium compound is used for the catalyst, an aluminum alkoxide is effectively added as an activator. Additionally, the bistriphenylphosphine complex of divalent iron (FeCl$_2$(PPh$_3$)$_2$) or bistriphenylphosphine complex of divalent nickel (NiCl$_2$(PPh$_3$)$_2$) is also suited for the catalyst.

The (meth)acrylic monomer to be used in the polymerization of the invention is not limited to any particular species but includes various species such as, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth) acrylate, 2-ethylhexyl (meth)acrylate, nonyl (meth)acrylate, decyl (meth)acrylate, dodecyl (meth)acrylate, phenyl (meth) acrylate, tolyl (meth)acrylate, benzyl (meth)acrylate, 2-methoxyethyl (meth)acrylate, 3-methoxybutyl (meth) acrylate, 2-hydroxyethyl (meth)acrylate and 2-hydroxypropyl (meth) acrylate. These may be used singly or two or more of them may be used in admixture. Where necessary, it is possible to use another kind of vinyl monomer, for example styrene, α-methylstyrene or acrylonitrile, additionally for copolymerization.

The polymerization of the invention can be carried out without using any solvent or in any of various solvents. The polymerization can be conducted at a temperature within the range of room temperature to 200° C., preferably at 50° C. to 150° C.

The hydroxyl-terminated (meth)acrylic polymer can be obtained by carrying out conversion reaction of the halogen of the halogen-terminated (meth)acrylic polymer obtained by the above polymerization.

A method suited for this purpose comprises preparing the (meth)acrylic polymer having a terminal structure of the general formula (1) by the above polymerization technique, and then reacting the said polymer with a compound having a polymerizable alkenyl group and a hydroxyl group as a second monomer. In this polymerization, the polymer terminus retains polymerizing activity; when a vinyl monomer is newly added, polymerization again advances. Thus, when a vinyl monomer having a polymerizable alkenyl group and a hydroxyl group is added, radical addition reaction occurs in the polymerizable alkenyl moiety while the hydroxyl group is retained, giving a hydroxyl-terminated (meth) acrylic polymer. Such second monomer may be added, together with a catalyst, to the isolated polymer after completion of the first polymerization so that it can newly react with said polymer, or said second monomer may be added for reaction in the course of the polymerization (in situ). In the latter case, monomer conversion in the first polymerization is desirably high, preferably not less than 80%. At a conversion less than 80%, hydroxyl groups are distributed on side chains, not at chain ends, with the result that the mechanical characteristics of the cured product are impaired.

On that occasion, theoretically, if such a compound having a polymerizable alkenyl group and a hydroxyl group is used in an amount equivalent to the number of polymer termini (which is approximately equal to the number of initiation sites of the initiator, since living polymerization is involved here), one hydroxyl group will be introduced into each terminus. For securing hydroxyl groups introduction into all termini, however, it is recommended that said compound be used in excess, more specifically, in an amount equivalent to 1 to 5 times the number of termini. If the amount is more than 5 times, hydroxyl groups introduction will result in high density and, frequently, the expected properties of the cured product is not obtained.

The compound having a polymerizable alkenyl group and the hydroxyl group is not limited to any particular species but includes, among others, compounds of the general formula (2)

(wherein R$^3$ represents hydrogen or methyl, R$^4$ represents —C(O) O— (ester group) or o-, m- or p-phenylene, and R$^5$ represents a direct bond or a divalent organic group containing 1 to 20 carbon atoms, which may optionally contain one or more ether bonds). One in which R$^4$ is an ester group is a (meth) acrylate compound, while one in which R$^4$ is a phenylene group is a styrenic compound. Examples of R$^5$ in the general formula (2) are alkylene groups such as methylene, ethylene and propylene; phenylene groups such as o-, m- and p-phenylene; aralkyl groups such as benzyl; and ether bond-containing alkylene groups such as —CH$_2$CH$_2$—O—CH$_2$CH$_2$— and —OCH$_2$CH$_2$—.

From the viewpoint of ready availability, the following are preferred among others:

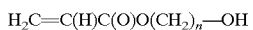

and

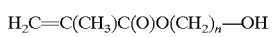

(wherein n is an integer of 1 to 20);

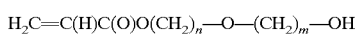

and

(wherein n and m each represents an integer of 1 to 20);

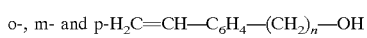

and

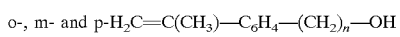

(wherein n represents an integer of 0 to 20); and

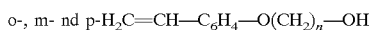

and

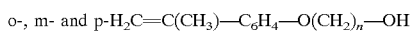

(wherein n is an integer of 1 to 20).

Another method usable for converting the terminal halogen to a hydroxyl-containing substituent comprises reacting the halogen-terminated (meth)acrylic polymer with an elemental metal or an organometallic compound to prepare an enolate anion, and then treating with an aldehyde or a ketone.

Said elemental metal includes, among others, alkali metals such as lithium, sodium and potassium; alkaline earth metals such as magnesium and calcium; aluminum; and zinc. Among them, zinc is particularly preferred since the enolate anion thereof will hardly attack any other ester groups or cause such a side reaction as rearrangement. As specific examples of the organometallic compound, there may be mentioned organolithium, organosodium, organopotassium, organomagnesium such as Grignard reagent, organoaluminum, organozinc, etc. For efficient preparation of the enolate anion, it is desirable to use organolithium or organomagnesium.

Said aldehyde or ketone is not limited to any particular species but includes various species, for example formaldehyde, acetaldehyde, propionaldehyde, benzaldehyde, acetone, methyl ethyl ketone, methyl isobutyl ketone, acetophenone and benzophenone.

The introduction of a hydroxyl-containing substituent by using zinc and an aldehyde or ketone constitutes the so-called Reformatsky reaction and this is also a particularly preferred mode of practice. In this reaction, various solvents may be used and, among them, aprotic solvents are preferred, among which ether solvents such as tetrahydrofuran and diethyl ether are most preferred. The reaction can be carried out at a temperature within the range of room temperature to 100° C.

A third method for producing the hydroxyl-terminated (meth)acrylic polymer comprises reacting the (meth)acrylic polymer having a terminal structure of the general formula (1) with a hydroxyl-containing oxy anion of the general formula (3)

$$M^+ \ O^-\text{—}R^6\text{—}OH \tag{3}$$

wherein $R^6$ is alkylene containing 1 to 20 carbon atoms, arylene containing 6 to 20 carbon atoms or divalent aralkyl containing 7 to 20 carbon atoms, which may optionally contain one or more ether bonds and $M^+$ is alkali metal ion or quaternary ammonium ion.

The $M^+$ is the counter ion of the oxy anion and includes, among others, alkali metal ions, such as lithium ion, sodium ion and potassium ion; and quaternary ammonium ions, such as tetramethylammonium ion, tetraethylammonium ion, trimethylbenzylammonium ion, trimethyldodecylammonium ion, tetrabutylammonium ion and dimethylpiperidinium ion.

The oxy anion of the general formula (3) can be prepared by reacting a diol compound, which is a precursor thereof, with an appropriate base. As such precursor, there may be mentioned, for example, the following compounds: HO—(CH$_2$)$_n$—OH (n being an integer of 2 to 20), HO—CH(CH$_3$)CH$_2$OH, HO—CH(CH$_3$) CH$_2$CH$_2$OH, HO—CH$_2$CH(CH$_3$)CH$_2$—OH, HO—CH$_2$C(CH$_3$)$_2$CH$_2$—OH, HO—CH$_2$C(CH$_3$)(C$_2$H$_5$)CH$_2$—OH, HO—CH$_2$C(C$_2$H$_5$)$_2$CH$_2$—OH, CH$_3$CH$_2$CH(OH)CH$_2$—OH, CH$_3$CH(OH)CH(OH)CH$_3$, HO—(CH$_2$O)$_n$—H (n being an integer of 1 to 20), HO—(CH$_2$CH$_2$O)$_n$—H (n being an integer of 1 to 10), HO—(CH$_2$CH(CH$_3$)O)$_n$—H (n being an integer of 1 to 6), o-, m- or p-HO—C$_6$H$_4$—OH, o-, m- or p-HO—C$_6$H$_4$—(CH$_2$)$_n$OH (n being an integer of 1 to 14), o-, m- or p-HO—(CH$_2$)$_n$—C$_6$H$_4$—(CH$_2$)$_m$OH (n and m each being an integer of 1 to 13 but n+m being not more than 14), 3-methylcatechol, 4-methylcatechol, 2-methylresorcinol, 4-methylresorcinol, 2,5-dimethylresorcinol, methylhydroquinone, 2,3-dimethylhydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, 4,4'-isopropylidenediphenol and the like. Among these, o-, m- or p-HO—C$_6$H$_4$—OH and o-, m- or p-HO—C$_6$H$_4$—(CH$_2$)$_n$OH (n being an integer of 1 to 14) are preferred since they are readily available and the corresponding oxy anions react mildly and attain selective substitution of the terminal halogen in the general formula (1). These diol compounds are sufficiently used in an amount of 1 molar equivalent, preferably 1 to 5 molar equivalents, relative to the terminus of the general formula (1).

For converting the above compound to the corresponding carbanion of the formula (3) by abstracting the proton, various bases are used. As these bases, there may be mentioned, for example, sodium methoxide, potassium methoxide, lithium methoxide, sodium ethoxide, potassium ethoxide, lithium ethoxide, sodium tert-butoxide, potassium tert-butoxide, sodium carbonate, potassium carbonate, lithium carbonate, sodium hydrogencarbonate, sodium hydride, potassium hydride, methyllithium, ethyllithium, n-butyllithium, tert-butyllithium, lithium diisopropylamide and lithium hexamethyldisilazide. The base is used generally in an amount of 0.5 to 3.0 equivalents, preferably 0.8 to 1.5 equivalents, relative to the precursor diol. As solvents which can be used in preparing the carbanion of the formula (3) by the reaction between said precursor and the base, there may be mentioned, for example, tetrahydrofuran, dioxane, diethyl ether, dimethylformamide, hexamethylphosphoric triamide, ethanol, methanol, isopropyl alcohol and tert-butyl alcohol.

It is also possible to obtain the hydroxyl-terminated (meth)acrylic polymer by reacting the (meth)acrylic polymer having a terminal structure of the general formula (1) with a hydroxyl-containing carboxylate anion of the general formula (4)

$$M^+ \ O^-C(O)\text{—}R^6\text{—}OH \tag{4}$$

wherein $R^6$ and $M^+$ are as defined above.

The carboxylate anion of the formula (4) can be prepared by reacting a hydroxyl-containing carboxylic acid, which is a precursor, with an appropriate base. Examples of such precursor are the following compounds: HO$_2$C—(CH$_2$)$_n$—OH (n being an integer of 1 to 20), HO$_2$C—CH(OH)CH$_3$, HO$_2$C—CH$_2$CH(OH) CH$_3$, o-, m- or p-HO$_2$C—C$_6$H$_4$—OH, o-, m- or p-HO$_2$C—(CH$_2$)$_n$—C$_6$H$_4$—OH, o-, m- or p-HO$_2$C—C$_6$H$_4$—(CH$_2$)$_n$—OH (n being an integer of 1 to 14), and o-, m- or p-HO$_2$C—(CH$_2$)$_n$—C$_6$H$_4$—(CH$_2$)$_m$—OH (n and m each being an integer of 1 to 13 but n+m being not more than 14).

For converting the above compound to the corresponding carboxylate anion of the formula (4) by abstracting the proton, those bases shown above as examples in relation to the preparation of the oxy anion of the formula (3) can suitably be used. Upon reacting the hydroxyl-containing carboxylic acid mentioned above with such a base, the carboxylic acid proton higher in acidity is abstracted, selectively giving the carboxylate anion of the formula (4). The base is used generally in an amount of 0.5 to 3.0 equivalents, preferably 0.8 to 1.5 equivalents, relative to the hydroxyl-containing carboxylic acid.

In polymerization of a (meth)acrylic monomer by using an organic halide or halogenated sulfonyl compound as an initiator and, as a catalyst, a metal complex with a central metal selected from the elements belonging to the groups 8, 9, 10 and 11 in the periodic table, a hydroxyl-containing halide is used as the initiator for obtaining a (meth)acrylic polymer having a hydroxyl group at one end and a halogen-containing group of the formula (1) at the other. The (meth) acrylic polymer having hydroxyl groups at both ends can be produced by converting the terminal halogen of the thus-obtained polymer into a hydroxyl-containing substituent.

The hydroxyl-containing halide is not limited to any particular species but preferably includes a compound of the general formula (5):

$$R^7R^8C(X)\text{—}R^9\text{—}R^5\text{—}OH \tag{5}$$

wherein $R^5$ is as defined above, $R^7$ and $R^8$ each represents hydrogen, univalent alkyl containing 1 to 20 carbon atoms, aryl containing 6 to 20 carbon atoms or aralkyl containing 7 to 20 carbon atoms or $R^7$ and $R^8$ may be connected at the other ends, $R^9$ represents —C(O)O— (ester group), —C(O)— (keto group) or o-, m- or p-phenylene, and X represents chlorine, bromine or iodine;

and that of the general formula (6):

HO—R⁵—C(R⁷)(X)—R⁹—R⁸ (6)

wherein R⁵, R⁷, R⁸, R⁹ and X are as defined above.

As specific examples of the compound of general formula (5), there may be mentioned the following:

XCH₂C(O)O(CH₂)ₙ—OH,

H₃CC(H)(X)C(O)O(CH₂)ₙ—OH, (H₃C)₂C(X)C(O)O(CH₂)ₙ—OH,

CH₃CH₂C(H)(X)C(O)O(CH₂)ₙ—OH and

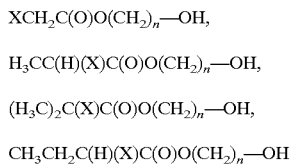

(wherein X represents chlorine, bromine or iodine and n represents an integer of 1 to 20);

XCH₂C(O)O(CH₂)ₙO(CH₂)ₘ—OH,

H₃CC(H)(X)C(O)O(CH₂)ₙO(CH₂)ₘ—OH, (H₃C)₂C(X)C(O)O(CH₂)ₙO(CH₂)ₘ—OH,

CH₃CH₂C(H)(X)C(O)O(CH₂)ₙO(CH₂)ₘ—OH and

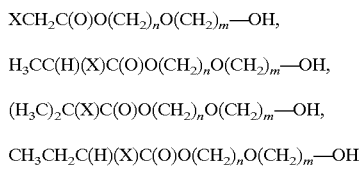

(wherein X represents chlorine, bromine or iodine, and n and m each represents an integer of 1 to 20);

o-, m- and p-XCH₂—C₆H₄—(CH₂)ₙ—OH, o-, m- and p-CH₃C(H)(X)—C₆H₄—(CH₂)ₙ—OH and o-, m- and p-CH₃CH₂C(H)(X)—C₆H₄—(CH₂)ₙ—OH (wherein X represents chlorine, bromine or iodine and n represents an integer of 0 to 20);

o-, m- and p-XCH₂—C₆H₄—(CH₂)ₙ—O—(CH₂)ₘ—OH, o-, m- and p-CH₃C(H)(X)—C₆H₄—(CH₂)ₙ—O—(CH₂)ₘ—OH, o-, m- and p-CH₃CH₂C(H)(X)—C₆H₄—(CH₂)ₙ—O(CH₂)ₘ—OH (wherein x represents chlorine, bromine or iodine, n represents an integer of 0 to 20 and m represents an integer of 1 to 20); and o-, m- and p-XCH₂—C₆H₄—O—(CH₂)ₙ—O—(CH₂)ₘ—OH, o-, m- and p-CH₃C(H)(X)—C₆H₄—O—(CH₂)ₙ—O—(CH₂)ₘ—OH, o-, m- and p-CH₃CH₂C(H)(X)—C₆H₄—O—(CH₂)ₙ—O—(CH₂)ₘ—OH (wherein X represents chlorine, bromine or iodine, and n and m each represents an integer of 1 to 20).

As specific examples of the compound of the general formula (6), there may be mentioned the following:

HO—CH₂C(H)(X)—CO₂R,

HO—(CH₂)₂C(H)(X)—CO₂R,

HO—(CH₂)₃C(H)(X)—CO₂R and

HO—(CH₂)₈C(H)(X)—CO₂R (wherein X represents chlorine, bromine or iodine and R represents alkyl, aryl or aralkyl containing up to 20 carbon atoms);

HO—CH₂C(H)(X)—C₆H₅,

HO—(CH₂)₂C(H)(X)—C₆H₅ and

HO—(CH₂)₃C(H)(X)—C₆H₅.

Specific examples of the halogenated sulfonyl compound having a hydroxyl group are:

o-, m- and p-HO—(CH₂)ₙ—C₆H₄—SO₂X (wherein X represents chlorine, bromine or iodine and n represents an integer of 0 to 20) and o-, m- and p-HO—(CH₂)ₙ—O—C₆H₄—SO₂X (wherein X represents chlorine, bromine or iodine and n represents an integer of 1 to 20).

When a (meth)acrylic monomer is polymerized by using the hydroxyl-containing halide as an initiator, the polymer having a hydroxyl group at one end and a terminal structure of the general formula (1) at the other end is obtained. For converting this terminal halogen to a hydroxyl group, each of the above-mentioned methods can suitably be applied.

The hydroxyl-terminated (meth)acrylic polymer can also be obtained by preparing the (meth)acrylic polymer having a hydroxyl group at one end and a terminal structure of the general formula (1) at the other end by the above method using the hydroxyl-containing halide as an initiator, and further subjecting the same to coupling reaction between the terminal halogens in the general formula (1) through a compound having at least two identical or different functional groups each capable of substituting the terminal halogen.

The compound having at least two identical or different functional groups each capable of substituting the terminal halogen shown in the formula (1) is not limited to any particular species but includes, as preferred ones, polyol, polyamine, polycarboxylic acid, polythiol, and salt thereof; and alkali metal sulfide. Specific examples of these are:

ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl) methane, 4,4'-isopropylidenediphenol, 3,3'-(ethylenedioxy)diphenol, α,α'-dihydroxy-p-xylene, 1,1,1-tris(4-hydroxyphenyl)ethane, pyrogallol, 1,2,4-benzenetriol, and alkali metal salts of such polyol compounds;

ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis (cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine, α,α'-diamino-p-xylene, and alkali metal salts of such polyamines;

oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid, 1,2,4,5-benzenetetracarboxylic acid, and alkali metal salts of such polycarboxylic acids;

1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethyl ether, p-xylene-α, α'-dithiol, 1,2-benzenedithiol, 1,3-benzenedithiol, 1,4-benzenedithiol, alkali metal salts of such polythiol compounds;

lithium sulfide, sodium sulfide and potassium sulfide.

In cases where the above-mentioned polyol, polyamine, polycarboxylic acid or polythiol is used, a basic compound is combinedly used for promoting substitution reaction. As specific examples thereof, there may be mentioned lithium, sodium, potassium, sodium carbonate, potassium carbonate, sodium hydrogencarbonate, sodium methoxide, potassium methoxide, sodium tert-butoxide, potassium tert-butoxide, sodium hydride and potassium hydride, among others.

The hydroxyl-terminated (meth)acrylic polymer obtained by any of the above-mentioned methods can be used in a curable composition comprising the same as a main component.

This curable composition comprises two components: (A) a hydroxyl-terminated (meth)acrylic polymer; and (B) a compound having at least two functional groups each capable of reacting with a hydroxyl group.

The hydroxyl-terminated (meth)acrylic polymer, namely the component (A), may be used either singly or as a mixture of two or more. Its molecular weight is not critical but is preferably within the range of 500 to 50,000. When the molecular weight is below 500, the intrinsic characteristics of the (meth)acrylic polymers are hardly manifested. When it exceeds 50,000, its viscosity becomes very high or its solubility becomes decreased, so that the polymer or composition becomes difficult to handle.

The compound having at least two functional groups each capable of reacting with a hydroxyl group, namely the component (B), is not limited to any particular species but includes, among others, polyisocyanate compounds having at least two isocyanato groups per molecule; aminoplast resins such as hydroxymethylated melamine and alkyl ethers or low degree condensates thereof; polyfunctional carboxylic acids and halides thereof.

The polyisocyanate compound having at least two isocyanato groups per molecule may be any of the known conventional ones, including, among others, isocyanate compounds such as 2,4-tolylene diisocyanate, 2,6-tolylene diisocyanate, 4,4'-diphenylmethane diisocyanate, hexamethylene diisocyanate, xylylene diisocyanate, metaxylylene diisocyanate, 1,5-naphthalene diisocyanate, hydrogenated diphenylmethane diisocyanate, hydrogenated tolylene diisocyanate, hydrogenated xylylene diisocyanate, isophoronediisocyanate, triisocyanates such as B-45 (product of Ipposha Oil Industries), etc.; biuret form polyisocyanates such as Sumidur N (product of Sumitomo Bayer Urethane); isocyanurate ring-containing polyisocyanate compounds such as Desmodur IL and HL (products of Bayer A.G.) and Coronate EH (product of Nippon Polyurethane Industry); and adduct form polyisocyanate compounds such as Sumidur L (product of Sumitomo Bayer Urethane) and Coronate HL (product of Nippon Polyurethane Industry). Blocked polyisocyanates may also be used. These may be used either singly or in combination.

A mixing ratio of the hydroxyl-terminated polymer to the compound having at least two isocyanato groups is not critical but, for example, a mole ratio of the isocyanato groups to the hydroxyl groups in the hydroxyl-terminated (meth)acrylic polymer (NCO/OH) is preferably 0.5 to 3.0, more preferably 0.8 to 2.0.

A catalyst such as an organotin compound or a tertiary amine may be added, if necessary, for promoting curing reaction between the hydroxyl-terminated (meth)acrylic polymer and the compound having at least two isocyanato groups in the curable composition of this invention.

As specific examples of the organotin compound, there may be mentioned stannous octoate, dibutyltin diacetate, dibutyltin dilaurate, dibutyltin mercaptides, dibutyltin thiocarboxylates, dibutyltin dimaleate, and dioctyltin thiocarboxylates. As the tertiary amine catalyst, there may be mentioned triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N'N",N"-pentamethyldiethylenetriamine, N,N,N',N",N"-pentamethyldipropylenetriamine, tetramethylguanidine, triethylenediamine, N,N'-dimethylpiperazine, N-methylmorpholine, 1,2-dimethylimidazole, dimethylaminoethanol, dimethylaminoethoxyethanol, N,N,N'-trimethylaminoethylethanolamine, N-methyl-N'-(2-hydroxyethyl)piperazine, N-(2-hydroxyethyl)morpholine, bis(2-dimethylaminoethyl) ether, ethylene glycol bis(3-dimethylaminopropyl) ether, etc.

The aminoplast resin to be used as the component (B) is not limited to any particular species but includes melamine-formaldehyde adducts (methylol compounds), low degree melamine-formaldehyde condensates, alkyl ethers derived from these, urea resins and the like. These may be used either singly or in combination. A conventional catalyst such as p-toluenesulfonic acid or benzenesulfonic acid may be added for promoting curing reaction between the hydroxyl-terminated (meth)acrylic polymer and the aminoplast resin.

The polyfunctional carboxylic acids and halides thereof, which is to be used as the component (B), is not limited to any particular species but includes, among others, polyfunctional carboxylic acids and anhydrides thereof such as oxalic acid, malonic acid, succinic acid, glutaric acid, adipic acid, phthalic acid, phthalic anhydride, terephthalic acid, trimellitic acid, pyromellitic acid, maleic acid, maleic anhydride, fumaric acid and itaconic acid, and halides thereof. These may be used either singly or in combination.

When both the components (A) and (B) of the present invention, if necessary together with the curing catalyst, are mixed up and subjected to curing, a cured product excellent in deep curing properties can be obtained. The curing conditions are not critical but, generally, a temperature of 0° C. to 100° C., preferably 20° C. to 80° C., is employed.

While the properties of the cured product depend on the principal chain skeleton and molecular weight of the component (A) polymer and of the component (B) curing agent, a great variety of cured products, from rubber-like ones to resin-like ones, can be produced.

Specific fields of application of the cured product obtained from the above composition include sealants, adhesives, tackifiers, elastic adhesives, paints, powder coatings, foamed products, potting materials in electric and electronic industries, films, molding materials and artificial marble.

According to the present invention, an alkenyl-terminated (meth)acrylic polymer can be produced by converting the terminal hydroxyl group of the hydroxyl-terminated (meth) acrylic polymer obtained by any of the methods mentioned above into an alkenyl-containing substituent.

The method for converting the terminal hydroxyl group into an alkenyl-containing substituent is not critical but may be any of various methods. For instance, there may be mentioned a method comprising treating with an alkenyl-containing halide such as allyl chloride and a base such as sodium methoxide; a method comprising treating with an alkenyl-containing isocyanate compound such as allyl isocyanate; a method comprising treating with an alkenyl-containing acid halide such as (meth)acryloyl chloride; and a method comprising treating with an alkenyl-containing carboxylic acid such as acrylic acid in the presence of an acid catalyst.

The alkenyl-containing halide to be used in carrying out the method comprising treating with the same and a base includes allyl chloride, allyl bromide, allyl iodide, 4-chloro-1-butene, 4-bromo-1-butene, 4-iodo-1-butene, 3-chloro-2-methyl-1-butene, 3-bromo-2-methyl-1-butene, 3-iodo-2-methyl-1-butene, etc. The said base includes sodium, potassium, sodium methoxide, potassium methoxide, sodium tert-butoxide, potassium tert-butoxide, sodium hydride, potassium hydride and the like.

The said alkenyl-containing isocyanate compound includes allyl isocyanate, butenyl isocyanate and the like. In treating with such compounds, a catalyst generally used for reaction between a hydroxyl group and an isocyanato group, for example a tin or amine catalyst, may be used.

The said alkenyl-containing acid halide includes (meth) acryloyl chloride, 3-butenoyl chloride, 4-pentenoyl chloride, 5-hexenoyl chloride, 10-undecenoyl chloride and the like. In actually performing the reaction, a base such as triethylamine or pyridine may be used combinedly.

The said alkenyl-containing carboxylic acid includes (meth)acrylic acid, 3-butenoic acid, 4-pentenoic acid, 5-hexenoic acid, 6-heptenoic acid, 7-octenoic acid and 10-undecenoic acid, among others. In actually carrying out the reaction, a condensation catalyst such as p-toluenesulfonic acid may be used.

The alkenyl-terminated (meth)acrylic polymer obtained by any of the methods mentioned above can be used in a curable composition comprising the same as a main component.

This curable composition comprises two components: (C) the alkenyl-terminated (meth)acrylic polymer obtained by any of the methods mentioned above; and (D) a hydrosilyl-containing compound.

The alkenyl-terminated (meth)acrylic polymer, namely the component (C), may be composed of a single species or two or more species. The molecular weight of the component (C) is not critical but preferably is within the range of 500 to 50,000. When it is 500 or less, the characteristics intrinsic in the (meth)acrylic polymer can hardly be manifested. When, conversely, it is 50,000 or more, its viscosity becomes very high or its solubility decreases, so that the polymer or composition becomes difficult to handle.

The hydrosilyl-containing compound, namely the component (D), is not limited to any particular species but may be any of various ones. Thus, use may be made of linear polysiloxanes of the general formula (7) or (8):

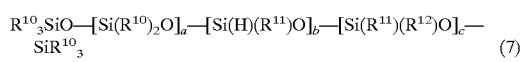 (7)

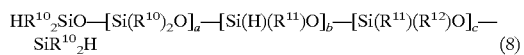 (8)

(wherein $R^{10}$ and $R^{11}$ each represents alkyl containing 1 to 6 carbon atoms, or phenyl, $R^{12}$ represents alkyl or aralkyl containing up to 10 carbon atoms, a represents an integer with the range $0 \leq a \leq 100$, b represents an integer within the range $2 \leq b \leq 100$, and c represents an integer within the range $0 \leq c \leq 100$);

and cyclic siloxanes of the general formula (9):

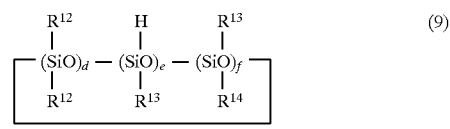 (9)

(wherein $R^{13}$ and $R^{14}$ each represents alkyl containing 1 to 6 carbon atoms, or phenyl, $R^{15}$ represents alkyl or aralkyl containing up to 10 carbon atoms, d represents an integer within the range $0 \leq d \leq 8$, e represents an integer within the range $2 \leq e \leq 10$, and f represents an integer within the range $0 \leq f \leq 8$, provided that $3 \leq d+e+f \leq 10$).

These may be used either singly or in combination. Among these siloxanes, phenyl-containing linear siloxanes of the general formula (10) or (11) shown below and cyclic siloxanes of the general formula (12) or (13) shown below are preferred from the viewpoint of compatibility with the (meth)acrylic polymer.

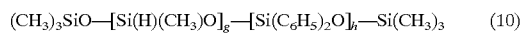 (10)

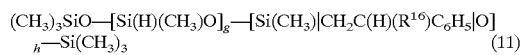 (11)

(wherein $R^{16}$ represents hydrogen or methyl, g represents an integer within the range $2 \leq g \leq 100$, h represents an integer within the range $0 \leq h \leq 100$, and $C_6H_5$ represents phenyl);

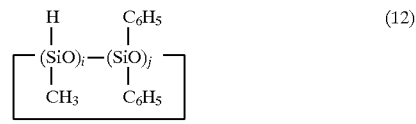 (12)

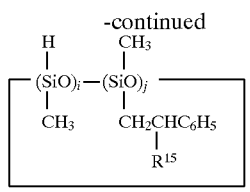 (13)

(wherein $R^{16}$ represents hydrogen or methyl, i represents an integer within the range $2 \leq i \leq 10$, j represents an integer within the range $0 \leq j \leq 8$, provided that $3 \leq i+j \leq 10$, and $C_6H_5$ represents phenyl).

As the curing agent having at least two hydrosilyl groups, namely the component (D), can further be used a compound prepared by subjecting a hydrosilyl-containing compound represented by any of the general formulas (7) to (13) to addition reaction with a low-molecular compound having at least two alkenyl groups per molecule in such a manner that hydrosilyl groups partly remain even after the reaction. The compound having at least two alkenyl groups per molecule includes various compounds. Examples are hydrocarbons such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3'-diallylbisphenol A, ester compounds such as diallyl phthalate, diallyl isophthalate, triallyl trimellitate and tetraallyl pyromellitate, and carbonate compounds such as diethylene glycol di(allyl carbonate).

The said compound can be prepared by slowly adding dropwise the alkenyl-containing compound mentioned above to an excess of a hydrosilyl-containing compound of any of the general formulas (7) to (13) in the presence of a hydrosilylation catalyst. As such compound, the following are preferred by taking into account ready availability of starting materials, easiness of removal of the excess siloxane and compatibility with the polymer of the component (C).

(wherein n is an integer of 2 to 4 and m is an integer of 5 to 10).

A mixing ratio of the polymer (C) to the curing agent (D) can be selected at will. From the curability viewpoint, an alkenyl/hydrosilyl mole ratio is preferably within the range of 5 to 0.2, more preferably 2.5 to 0.4. The mole ratio exceeding 5 results in insufficient curing, giving only cured products which are sticky and low in strength. At the ratio smaller than 0.2, active hydrosilyl-groups remain in a large quantity in the cured product even after curing and, as a result, cracks and voids are formed and no uniform and strong cured products can be obtained.

The curing reaction between the polymer (C) and the curing agent (D) can proceed upon admixing both the components and heating. A hydrosilylation catalyst is added for promoting the reaction. As such a hydrosilylation catalyst, there may be mentioned radical initiators such as organic peroxides and azo compounds, as well as transition metal catalysts.

The radical initiators are not limited to any particular species but include various ones. Examples are dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and α,α'-bis(t-butylperoxy)isopropylbenzene; diacyl peroxides such as benzoyl peroxide, p-chlorobenzoyl peroxide, m-chlorobenzoyl peroxide, 2,4-dichlorobenzoyl peroxide and lauroyl peroxide; peroxy esters such as t-butyl perbenzoate; peroxydicarbonate such as diisopropyl peroxydicarbonate and di-2-ethylhexyl peroxydicarbonate; and peroxyketals such as 1,1-di(t-butylperoxy)cyclohexane and 1,1-di(t-butylperoxy)-3,3,5-trimethylcyclohexane.

As the transition metal catalysts, there may be mentioned, among others, elemental platinum, solid platinum dispersed on a support such as alumina, silica or carbon black, chloroplatinic acid, complexes of chloroplatinic acid with an

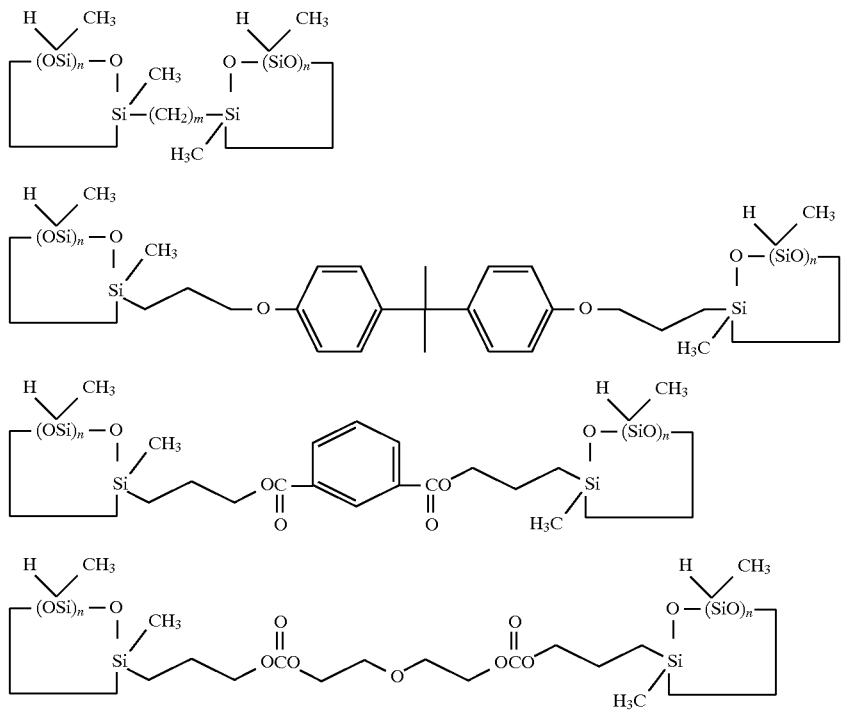

alcohol, aldehyde, ketone or the like, platinum-olefin complexes and platinum(O)-divinyltetramethyldisiloxane complex. As examples other than platinum compounds, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$, TiCl$_4$ and the like. These catalysts may be used either singly or in combination. Although an amount of the catalyst is not critical, it is recommended that the catalyst be used in an amount of $10^{-1}$ to $10^{-8}$ mole, preferably $10^{-3}$ to $10^{-6}$ mole, per mole of the alkenyl groups in the component (A). When the amount is less than $10^{-8}$ mole, curing cannot proceed to a satisfactory extent. Since the hydrosilylation catalyst is expensive, its use in an amount exceeding $10^{-1}$ mole is undesirable.

Both the components (C) and (D), if necessary together with a hydrosilylation catalyst, when mixed up and subjected to curing, give cured products which are uniform and excellent in deep curing properties. Its curing conditions are not critical. Generally, however, it is recommended that curing be conducted at 0° C. to 200° C., preferably at 30° C. to 150° C., for 10 seconds to 24 hours. In particular, at a high temperature of 80° C. to 150° C., some compositions may be cured within a short period of time, say about 10 seconds to 1 hour.

While the properties of the cured product depend on the principal chain skeleton and molecular weight of the component (C) polymer and of the component (C) curing agent, a great variety of cured products, from rubber-like ones to resin-like ones, can be produced.

Specific fields of application of the cured product obtained from the above composition include sealants, adhesives, tackifiers, elastic adhesives, paints, powder coatings, foamed products, potting materials for electric and electronic devices, films, gaskets, various molding materials and artificial marble, among others.

According to the present invention, a crosslinkable silyl-terminated (meth)acrylic polymer can be produced by subjecting the alkenyl-terminated (meth)acrylic polymer obtained by any of the methods mentioned above to addition reaction with a crosslinkable silyl-containing hydrosilane compound. Those alkenyl-terminated (meth)acrylic polymers produced by the methods already mentioned hereinabove can each be suitably used as said starting polymer.

Although the hydrosilane compound is not limited to any particular species, typical examples are compounds of the general formula (14):

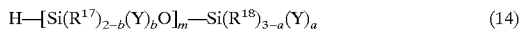

(wherein $R^{17}$ and $R^{18}$ each represents alkyl, aryl or aralkyl containing up to 20 carbon atoms or triorganosiloxy of the formula (R')$_3$SiO— (in which R' is a univalent hydrocarbon group containing 1 to 20 carbon atoms and the three R' groups may be the same or different) and when two or more $R^{17}$ or $R^{18}$ groups are present, they may be the same or different; Y represents a hydroxyl or hydrolyzable group and when two or more Y groups are present, they may be the same or different; a represents 0, 1, 2 or 3, b represents 0, 1 or 2 and m represents an integer of 0 to 19, provided that the condition a+mb≧1 should be satisfied).

The hydrolyzable group represented by Y is not limited to any particular species but may be any of the conventional ones. Specifically, mention may be made of hydrogen, halogen atom, alkoxy, acyloxy, ketoximate, amino, amide, acid amide, aminooxy, mercapto, alkenyloxy and like groups. From the viewpoint of mild hydrolizability and ease of handling, alkoxy groups are particularly preferred. The number of such hydrolyzable groups or hydroxyl groups bound to one silicon atom may be 1 to 3 and the total number of hydrolyzable groups, namely a+mb, is preferably within the range of 1 to 5. When two or more hydrolyzable groups or hydroxy groups occur in a reactive silicon group, they may be the same or different. The number of the silicon atoms constituting the crosslinkable silicon compound may be one, two or more and, in cases where the silicon atoms are linked together via siloxane bonding, said number may be up to about 20.

As specific examples of $R^{17}$ and $R^{18}$ in the general formula (14), there may be mentioned alkyl groups such as methyl and ethyl; cycloalkyl groups such as cyclohexyl; aryl groups such as phenyl; aralkyl groups such as benzyl; and triorganosilyl groups of the formula (R')$_3$SiO— in which R' is methyl or phenyl, for instance.

Among those hydrosilane compounds, a crosslinkable group-containing hydrosilan compounds of the general formula (15)

(wherein $R^{18}$, Y and a are as defined above) is preferred from the easy availability viewpoint. Specific examples of the crosslinkable group-containing hydrosilane compounds of the general formula (14) or (15) are as follows:

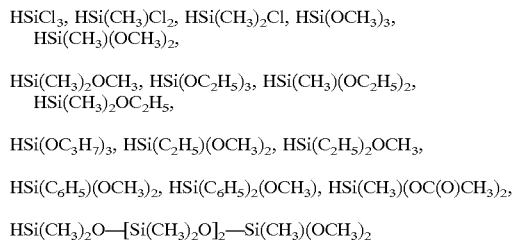

and

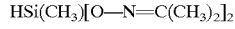

(wherein C$_6$H$_5$ represents phenyl).

In subjecting such a crosslinkable silyl-containing hydrosilane compound to addition reaction with the alkenyl-terminated (meth)acrylic polymer, a hydrosilylation catalyst can be used, which may be any of those already mentioned hereinabove.

The crosslinkable silyl-terminated (meth)acrylic polymer can also be produced by reacting a hydroxyl-terminated (meth) acrylic polymer with a compound containing a crosslinkable silyl group and a functional group reactive with the hydroxyl group. The functional group reactive with the hydroxyl group includes, among others, halogen-containing groups, carboxylic acid halide, carboxylic acid and isocyanato group. The isocyanato group is preferred, however, since the corresponding compounds are readily available and since the reaction conditions in the reaction with the hydroxyl group are mild, hence the crosslinkable silyl group is hardly decomposed.

The said crosslinkable silyl-containing isocyanate compound is not limited to any particular species but may be any of conventional ones. Specific examples are as follows:

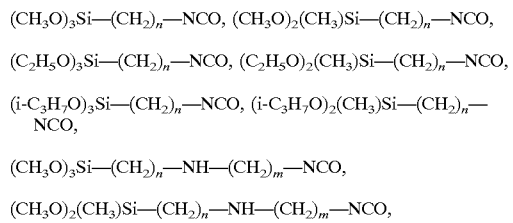

$(C_2H_5O)_3Si-(CH_2)_n-NH-(CH_2)_m-NCO,$ $(C_2H_5O)_2(CH_3)Si-(CH_2)_n-NH-(CH_2)_m-NCO,$ $(i-C_3H_7O)_3Si-(CH_2)_n-NH-(CH_2)_m-NCO$ and $(i-C_3H_7O)_2(CH_3)Si-(CH_2)_n-NH-(CH_2)_m-NCO$ (wherein n and m each being an integer of 1 to 20).

The reaction between the hydroxyl-terminated (meth) acrylic polymer and the compound containing a crosslinking silyl group and a functional group reactive with a hydroxyl group can be carried out without using any solvent or in various solvents, at a temperature of 0° C. to 100° C. preferably 20° C. to 50° C. On that occasion, the above-mentioned tin catalysts or tertiary amine catalysts may be used for promoting reaction between the hydroxyl and functional groups.

The crosslinkable silyl-terminated (meth)acrylic polymer obtained by any of the methods mentioned above can be used in a curable composition containing the same as a main component.

The main component (meth)acrylic polymer may be composed either of a single species or of two or more species in admixture. Although molecular weight thereof is not critical, it is preferably within the range of 500 to 50,000. When it is 500 or below, the intrinsic characteristics of the (meth) acrylic polymer can hardly be manifested. When it is 50,000 or more, handling of the polymer becomes difficult.

Upon contact with water, the hydrolyzable silyl-terminated (meth)acrylic polymer forms a network structure by condensation reaction to give a cured product having a three-dimensional structure (crosslinked product). Since hydrolysis rate varies depending on temperature, humidity and a kind of hydrolyzable group, appropriate hydrolyzable group selection should be made according to the application conditions. During storage of the hydrolyzable silyl-terminated (meth) acrylic polymer, it is necessary to avoid contact with water as far as possible.

For promoting the curing reaction, a curing catalyst may be added. The curing catalyst includes titanate esters such as tetrabutyl titanate and tetrapropyl titanate; organotin compounds such as dibutyltin dilaurate, dibutyltin maleate, dibutyltin diacetate, stannous octoate and stannous naphthenate; lead octanoate; amine compounds, such as butylamine, octylamine, dibutylamine, monoethanolamine, diethanolamine, triethanolamine, diethylenetriamine, triethylenetetraamine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo [5.4.6]undecene-7, and carboxylic acid salts thereof; low-molecular-weight polyamide resins prepared from an excess polyamine and a polybasic acid; reaction products from an excess polyamine and an epoxy compound; amino-containing silane coupling agents such as γ-aminopropyltrimethoxysilane and N-(β-aminoethyl) aminopropylmethyldimethoxysilane and other known silanol catalysts. These may be used either alone or in combination.

The curing catalyst is used preferably in an amount of 0 to 10% by weight relative to the crosslinkable silyl-terminated (meth)acrylic polymer. In cases where the hydrolyzable group Y is an alkoxy group, the polymer shows a slow rate of curing and therefore the use of a curing catalyst is recommended.

When subjected to curing treatment, the crosslinkable silyl-terminated (meth)acrylic polymer, admixed with a curing catalyst as necessary, can give a uniform cured product. The curing conditions are not critical but, generally, curing is carried out at 0° C. to 100° C., preferably 10° C. to 50° C., for about 1 hour to 1 week. While the properties of the cured product depend on the principal chain skeleton and molecular weight of the polymer, a great variety of cured products, from rubber-like ones to resin-like ones, can be produced.

Specific fields of application of the cured product obtainable from the above composition include sealants, adhesives, tackifiers, elastic adhesives, paints, powder coatings, foamed products, potting materials for electric and electronic devices, films, molding materials, artificial marble, etc.

According to the present invention, those (meth)acrylic polymers which are hydroxyl-terminated at both ends in a high proportion contents and which have been difficult to produce in the prior art can be obtained in an easy and simple manner.

They can give cured products with good curing characteristics. By utilizing the reactivity of their hydroxyl groups, alkenyl- or crosslinkable silyl-terminated (meth)acrylic polymers can also be obtained in an easy and simple manner and the respective terminally functional (meth) acrylic polymers can give cured products with good curing characteristics.

BEST MODE FOR CARRYING OUT THE INVENTION

The following examples are further illustrative of the present invention but are by no means limitative of the scope thereof.

EXAMPLE 1

A 30-mL pressure reaction vessel was charged with n-butyl acrylate (5 mL, 4.47 g, 34.9 mmol), α-α'-dibromo-p-xylene (185 mg, 0.70 mmol), cuprous bromide (100 mg, 0.70 mmol), 2,2'-bipyridyl (326 mg, 2.10 mmol), ethyl acetate (4 mL) and acetonitrile (1 mL). The dissolved oxygen was removed by bubbling of nitrogen for 10 minutes, and then the vessel was sealed. The mixture was heated at 130° C. to cause the reaction to proceed for 3 hours. The reaction vessel was cooled to room temperature, 2-hydroxyethyl methacrylate (0.352 mL, 364 mg, 2.80 mmol) was added and, after sealing, the reaction was conducted at 80° C. for 2 hours. The mixture was diluted with ethyl acetate (20 mL) and washed with three portions of 10% hydrochloric acid and with one portion of brine. The organic layer was dried over sodium sulfate and the solvent was then distilled off under reduced pressure to give 4.11 g (82%) of a hydroxyl-terminated derivative of poly(n-butyl-acrylate) having the formula shown below. The number average molecular weight of the polymer as determined by GPC (on the polystyrene basis) was 5,900, with molecular weight distribution of 1.45. Its $^1$H NMR analysis showed that the polymer contained, on an average, 3.2 hydroxyl groups per molecule.

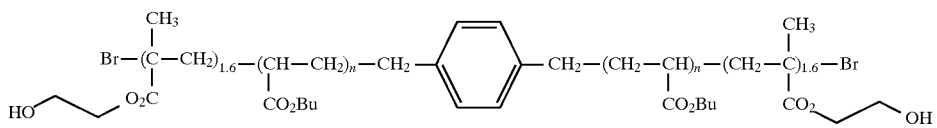

Production Example 1
Production of hydroxyl-containing initiator

In a nitrogen atmosphere, 2-bromopropionyl chloride (2 mL, 3.35 g, 19.5 mmol) was slowly added dropwise to a solution of ethylene glycol (10.9 mL, 195 mmol) and pyridine (3 g, 39 mmol) in THF (10 mL) at 0° C. The resulting solution was then stirred at that temperature for 2 hours. Diluted hydrochloric acid (20 mL) and ethyl acetate (30 mL) were added and the mixture was allowed to separate into two layers. The organic layer was separated, washed with diluted hydrochloric acid and brine and dried over sodium sulfate, and the volatile matter was distilled off under reduced pressure, to give a crude product (3.07 g). Distillation of this crude product under reduced pressure (70°–73° C., 0.5 mmHg) gave 2-hydoxyethyl 2-bromopropionate of the formula shown below (2.14 g, 56%).

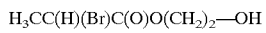

EXAMPLE 2

A 30-mL pressure reaction vessel was charged with n-butyl acrylate (5 mL, 4.47 g, 34.9 mmol), the hydroxyl-containing initiator obtained in Production Example 1 (138 mg, 0.698 mmol), cuprous bromide (100 mg, 0.698 mmol), 2,2'-bipyridyl (218 mg, 1.40 mmol), ethyl acetate (4 mL) and acetonitrile (1 mL). The dissolved oxygen was removed by bubbling of nitrogen, and then the vessel was sealed. The mixture was heated at 130° C. to cause the reaction to proceed for 2 hours. The reaction vessel was cooled to room temperature, 2-hydroxyethyl methacrylate (0.176 mL, 182 mg, 1.40 mmol) was added and the reaction was further carried out at 100° C. for 2 hours. The mixture was diluted with ethyl acetate (20 mL) and, after removal of the insoluble matter by filtration, the filtrate was washed with two portions of 10% hydrochloric acid and with one portion of brine. The organic layer was dried over sodium sulfate and the solvent was then distilled off under reduced pressure to give 4.44 g of a hydroxyl-terminated derivative of poly(n-butyl acrylate) of the formula shown below (yield: 93%). The number average molecular weight of the polymer as determined by GPC (polystyrene basis) was 6,100 with molecular weight distribution of 1.32. According to NMR spectrometry, the polymer contained, on an average, 3.3 hydroxyl groups per molecule.

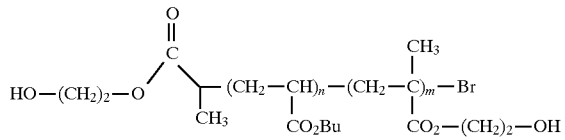

EXAMPLE 3

A modification of poly(n-butyl acrylate) (6.96 g, 75% yield) as represented by the above formula was obtained in the same manner as in Example 2 except that n-butyl acrylate was used in an amount of 10 mL. The number average molecular weight of the polymer as determined by GPC (polystyrene basis) was 8,300 with molecular weight distribution of 1.32. According to NMR spectrometry, the polymer contained, on an average, 2.2 hydroxyl groups per molecule.

EXAMPLE 4

A modification of poly(n-butyl acrylate) (5.75 g, 82% yield) as represented by the above formula was obtained in the same manner as in Example 2 except that n-butyl acrylate was used in an amount of 7.5 mL. The number average molecular weight of the polymer as determined by GPC (polystyrene basis) was 7,500 with molecular weight distribution of 1.36. According to NMR spectrometry, the polymer contained, on an average, 2.1 hydroxyl groups per molecule.

EXAMPLE 5

A 50-mL pressure reaction vessel was charged with n-butyl acrylate (10.94 mL, 9.78 g, 76.3 mmol), the hydroxyl-containing initiator obtained in Production Example 1 (301 mg, 1.53 mmol), cuprous bromide (219 mg, 1.53 mmol), 2,2'-bipyridyl (476 mg, 3.05 mmol), ethyl acetate (8.8 mL) and acetonitrile (2.2 mL). The dissolved oxygen was removed by bubbling of nitrogen, and then the vessel was sealed. The mixture was heated at 130° C. to cause the reaction to proceed for 1.3 hours. The mixture was diluted with ethyl acetate (20 mL) and washed with three portions of 10% hydrochloric acid and with one portion of brine. The organic layer was dried over sodium sulfate and the solvent was then distilled off under reduced pressure to give 5.23 g of poly(n-butyl acrylate) containing a hydroxyl group at one end (yield: 53%). The number average molecular weight of the polymer as determined by GPC (polystyrene basis) was 3,400 with molecular weight distribution of 1.31. According to $^1$H-NMR spectrometry, the polymer contained, on an average, 1.09 hydroxyl groups per molecule.

A three-necked 50-mL flask equipped with a reflux condenser and a stirrer was then charged with the poly(n-butyl acrylate) having the hydroxyl group at one end as obtained in the above manner (2.15 g), Na$_2$S.9H$_2$O (76.3 mg, 0.318 mmol) and ethanol (3 mL). The mixture was stirred for 3 hours at reflux temperature. After cooling down to room temperature, ethyl acetate (5 mL) and 10% hydrochloric acid (5 mL) were added and the mixture was allowed to separate into two layers. The organic layer was washed with 10% hydrochloric acid and brine and, after drying over Na$_2$SO$_4$, the volatile matter was distilled off under reduced pressure to give poly(n-butyl acrylate) having the hydroxyl group at both ends (560 mg) and represented by the formula shown below. The polymer obtained has number average molecular weight of 5,700 as determined by GPC (on the polystyrene basis), with molecular weight distribution of 1.39.

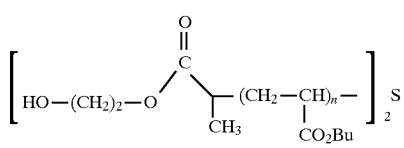

EXAMPLE 6 TO 10

Production of cured products

The poly(n-butyl acrylate) modification having a hydroxyl group at both ends as obtained in one of Examples 1 to 5 was thoroughly blended with a trifunctional isocyanate compound having the formula shown below (B-45, product of Ipposha Oil Industries) and a tin catalyst (dibutyltin diacetylacetonate, U-220, product of Nitto Kasei). The mixing ratio was such that the mole ratio between the hydroxyl group of the (meth) acrylic polymer and the isocyanato group of the isocyanate compound amounted to 1/1 and the tin catalyst amounted to 0.1 part by weight per 100 parts by weight of the polymer.

The above mixture was defoamed under reduced pressure, then cast into a mold and cured by heating at 80° C. for 15 hours. The resulting cured product was immersed in toluene for 24 hours and the gel fraction was calculated based on the weight change between preimmersion and postimmersion. The results thus obtained are shown below in Table 1.

EXAMPLE 11

Using a 1-liter autoclave, the procedure of Example 2 was followed on a scale 20 times that of Example 2 (using 100 g of n-butyl acrylate) to give 82 g (75%) of hydroxyl-terminated poly(n-butyl acrylate). The polymer obtained has number average molecular weight of 5,100 as determined by GPC (on the polystyrene basis), with molecular weight distribution of 1.29.

To a toluene solution (100 mL) of the hydroxyl-terminated poly(n-butyl acrylate) (50 g) obtained in the above manner and pyridine (10 mL) was slowly added 10-undecenoyl chloride (7.22 mL, 6.81 g, 33.6 mmol) dropwise in a nitrogen atmosphere at 60° C. and the mixture was stirred at 60° C. for 3 hours. The resulting white solid was filtered off and the organic layer was washed with diluted hydrochloric acid and brine. The organic layer was dried over $Na_2SO_4$ and concentrated under reduced pressure to give alkenyl-terminated poly(n-butyl acrylate) (43 g) having the formula shown below. The polymer obtained has number average molecular weight of 5,400 as determined by GPC (on the polystyrene basis), with molecular weight distribution of 1.3.

The average number of alkenyl groups per polymer molecule as determined by $^1$H-NMR analysis was 2.28.

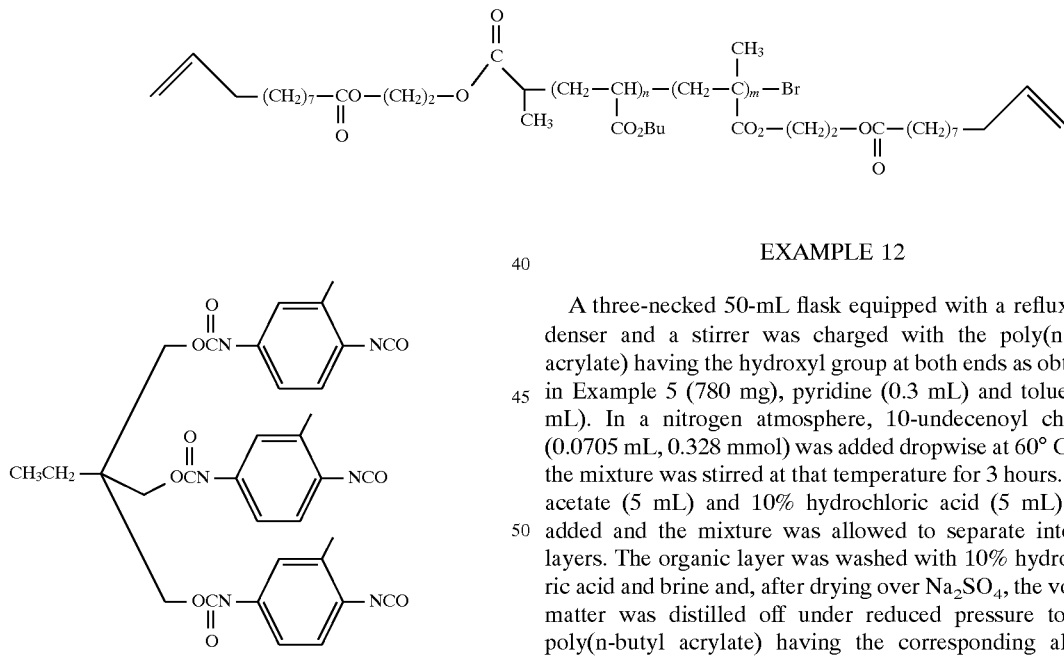

EXAMPLE 12

A three-necked 50-mL flask equipped with a reflux condenser and a stirrer was charged with the poly(n-butyl acrylate) having the hydroxyl group at both ends as obtained in Example 5 (780 mg), pyridine (0.3 mL) and toluene (2 mL). In a nitrogen atmosphere, 10-undecenoyl chloride (0.0705 mL, 0.328 mmol) was added dropwise at 60° C., and the mixture was stirred at that temperature for 3 hours. Ethyl acetate (5 mL) and 10% hydrochloric acid (5 mL) were added and the mixture was allowed to separate into two layers. The organic layer was washed with 10% hydrochloric acid and brine and, after drying over $Na_2SO_4$, the volatile matter was distilled off under reduced pressure to give poly(n-butyl acrylate) having the corresponding alkenyl group at both ends (560 mg) and represented by the formula shown below. The polymer obtained has number average molecular weight of 6,500 as determined by GPC (on the polystyrene basis), with molecular weight distribution of 1.31.

TABLE 1

| Example | 6 | 7 | 8 | 9 | 10 |
|---|---|---|---|---|---|
| Polymer | Example 1 | Example 2 | Example 3 | Example 4 | Example 5 |
| Gel fraction (%) | 71 | 91 | 62 | 77 | 89 |

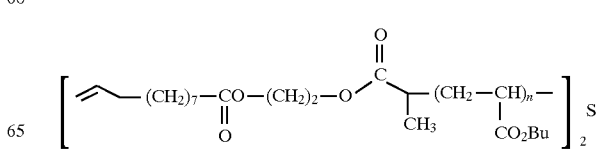

EXAMPLES 13 TO 14

The poly(butyl acrylate) having the alkenyl group at both ends as obtained in Example 11 or 12, a hydrosilyl-containing compound having the formula shown below, and 1,1,3,3-tetramethyl-1,3-divinyldisiloxane-platinum (valence: 0) complex ($8.3 \times 10^{-8}$ mol/L xylene solution) were mixed up. The hydrosilyl-containing compound was used at a mole ratio of the alkenyl group of the polymer to the hydrosilyl group of the hydrosilyl-containing compound being 1/1.2, while the platinum catalyst was used at a mole ratio of $10^{-4}$ to $10^{-3}$ equivalent relative to the alkenyl group of the polymer.

A portion of the thus-obtained composition was subjected to testing for curing on a hot plate at 130° C. and the gel time was measured. The remainder of the composition was degassed under reduced pressure and cast into a casting mold and cured by heating to give a rubber-like cured product. The cured product was immersed in toluene for 24 hours and the gel fraction was determined from the change in weight. The results thus obtained are shown in Table 2.

The poly(n-butyl acrylate) having the corresponding crosslinkable silyl group at both ends as obtained in the above manner (1 g) was then mixed up with a curing catalyst (U-220, product of Nitto Kasei; dibutyltin diacetylacetonate, 30 mg), and then the mixture was cast into a mold and degassed in a vacuum desiccator at room temperature. After 7 days of standing at room temperature, the mixture gave a homogeneous rubber-like cured product. The gel fraction was 78%.

Production Example 2

A 100-mL reaction vessel was charged with n-butyl acrylate (20 mL, 17.9 g, 0.140 mol), diethyl 2,5-dibromoadipate (0.628 g, 1.74 mmol), cuprous bromide (225 mg, 1.57 mmol), pentamethyldiethylenetriamine (0.328 mL, 0.272 g, 1.57 mmol) and toluene (2.0 mL). After lyophilization, the vessel atmosphere was substituted with nitrogen. The mixture was heated at 70° C. to cause the reaction to proceed for 45 minutes. At that time, the conversion of the monomer was 82%. The mixture was diluted with ethyl acetate and then passed through a column packed with activated alumina to remove the copper catalyst. Thus was obtained a bromo-terminated derivative of poly(n-butyl acrylate) of the formula shown below. The number average molecular weight of the polymer was 10,200 with molecular weight distribution of 1.14.

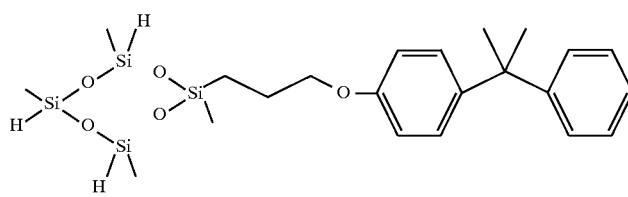

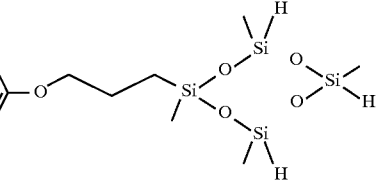

TABLE 2

| Example | Polymer | Catalyst Level (mole %) | Gel Time at 130° C. | Curing Condition | Gel Fraction (%) |
|---|---|---|---|---|---|
| 13 | Example 11 | $10^{-4}$ | 8 seconds | 100° C. 14 hours | 84 |
| 14 | Example 12 | $10^{-3}$ | 5 minutes | 130° C. 15 hours | 85 |

EXAMPLE 15

A 30-mL pressure reactor was charged with the poly(butyl acrylate) having the alkenyl group at both ends as obtained in Example 11 (2 g), methyldimethoxysilane (0.32 mL), methyl orthoformate (0.09 mL, 3 equivalents relative to the alkenyl group), and 1,1,3,3-tetramethyl-1,3-divinyldisiloxane-platinum (valence: 0) complex ($8.3 \times 10^{-8}$ mol/L xylene solution; $10^{-4}$ equivalent relative to the alkenyl group), and then the mixture was stirred at 100° C. for 1 hour. The volatile matter was distilled off under reduced pressure to give 2 g of poly(n-butyl acrylate) having the methyldimethoxysilyl group at both ends and having the formula shown below.

EXAMPLE 16

The poly(n-butyl acrylate) (5.00 g) as obtained in Production Example 2 and sodium 4-hydroxybutanoate (0.248 g, 1.967 mmol) was mixed in N,N-dimethylacetamide (10 mL). After stirring at 70° C. for 3 hours, the reaction mixture was diluted with ethyl acetate and washed with water. The volatile matter of the organic layer was distilled off under reduced pressure to give the polymer having a hydroxyl group at both ends and having the formula shown below. The average number of hydroxyl groups per polymer molecule as determined by $^1$H-NMR analysis was 1.66.

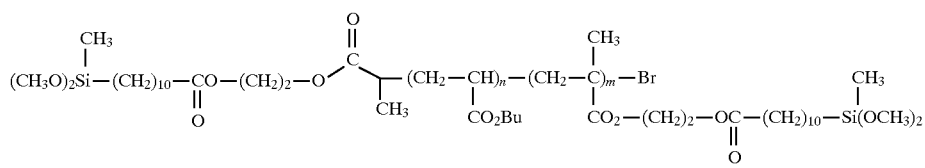

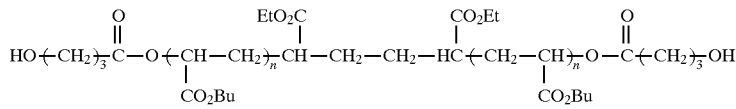

EXAMPLE 17

The poly(n-butyl acrylate) modification having a hydroxyl group at both ends as obtained in Example 16 was thoroughly blended with a trifunctional isocyanate compound used in Examples 6 to 10 (B-45, product of Ipposha Oil Industries). The mixing ratio was such that the mole ratio of the hydroxyl group of the polymer to the isocyanato group of the isocyanate compound amounted to ⅓.

The above mixture was defoamed under reduced pressure, and then cured by heating at 100° C. for 24 hours. The resulting cured product was immersed in toluene for 24 hours. The gel fraction, which was calculated based on the weight change between preimmersion and postimmersion, was 97%.

We claim:

1. A method for producing a hydroxyl-terminated (meth)acrylic polymer which comprises converting a halogen atom in a terminal structure of the general formula (1)

$$-CH_2-C(R^1)(CO_2R^2)(X) \qquad (1)$$

wherein $R^1$ is hydrogen or methyl, $R^2$ is alkyl containing 1 to 20 carbon atoms, aryl containing 6 to 20 carbon atoms or aralkyl containing 7 to 20 carbon atoms, and X is chlorine, bromine or iodine, of a (meth)acrylic polymer obtained by polymerizing a (meth)acrylic monomer using an organic halide or a halogenated sulfonyl compound as an initiator and, as a catalyst, a metal complex with a central metal selected from the elements belonging to the groups 8, 9, 10 and 11 in the periodic table, into a hydroxyl-containing substituent.

2. The method according to claim 1, wherein the (meth)acrylic polymer having a terminal structure of the general formula (1) is produced by polymerizing a (meth)acrylic monomer using an organic halide or a halogenated sulfonyl compound as an initiator and, as a catalyst, a metal complex with a central metal selected from the elements belonging to the groups 8, 9, 10 or 11 in the periodic table, and is further reacted with a compound having a polymerizable alkenyl group and a hydroxyl group.

3. The method according to claim 2, wherein the compound having a polymerizable alkenyl group and a hydroxyl group is a compound of the general formula (2):

$$H_2C=C(R^3)-R^4-R^5-OH \qquad (2)$$

wherein $R^3$ is hydrogen or methyl, $R^4$ is —C(O)O— (ester group) or o-, m- or p-phenylene, and $R^5$ is a direct bond or a divalent organic group containing 1 to 20 carbon atoms, which may optionally contain one or more ether bonds.

4. The method according to claim 1, which comprises reacting the (meth)acrylic polymer having a terminal structure of the general formula (1) with an elemental metal or an organometallic compound to prepare an enolate anion and then treating with an aldehyde or a ketone.

5. The method according to claim 4, wherein the elemental metal is zinc.

6. The method according to claim 1, which comprises reacting the (meth)acrylic polymer having a terminal structure of the general formula (1) with a hydroxyl-containing oxy anion of the general formula (3)

$$M^+O^--R^6-OH \qquad (3)$$

wherein $R^6$ is alkylene containing 1 to 20 carbon atoms, arylene containing 6 to 20 carbon atoms or divalent aralkyl containing 7 to 20 carbon atoms, which may optionally contain one or more ether bonds and $M^+$ is alkali metal ion or quaternary ammonium ion, or with a hydroxyl-containing carboxylate anion of the general formula (4)

$$M^+O^--C(O)-R^6-OH \qquad (4)$$

wherein $R^6$ and $M^+$ are as defined above.

7. The method according to claim 1, wherein the organic halide or the halogenated sulfonyl compound, which is an initiator, is a hydroxyl-containing halide.

8. The method according to claim 7, wherein the hydroxyl-containing halide is a compound of the general formula (5)

$$R^7R^8C(X)-R^9-R^5-OH \qquad (5)$$

wherein $R^5$ is as defined above, $R^7$ and $R^8$ each is hydrogen, alkyl containing 1 to 20 carbon atoms, aryl containing 6 to 20 carbon atoms or aralkyl containing 7 to 20 carbon atoms or $R^7$ and $R^8$ may be connected at the other ends, $R^9$ is —C(O)O— (ester group), —C(O)— (keto group) or o-, m- or p-phenylene, and X is chlorine, bromine or iodine; or that of the general formula (6)

$$HO-R^5-C(R^7)(X)-R^9-R^8 \qquad (6)$$

wherein $R^5$, $R^7$, $R^8$, $R^9$ and X are as defined above.

9. A method for producing a hydroxyl-terminated (meth)acrylic polymer which comprises preparing the (meth)acrylic polymer having a hydroxyl group at one end and a terminal structure of the general formula (1) at the other end by the method according to claim 7, or and further subjecting the same to coupling reaction between the terminal halogens in the general formula (1) through a compound having at least two identical or different functional groups each capable of substituting the terminal halogen.

10. The method according to claim 9, wherein the coupling reaction between the terminal halogens in the general formula (1) is carried out by using a compound selected from the group consisting of polyol, polyamine, polycarboxylic acid, polythiol, and salt thereof; and alkali metal sulfide.

11. A hydroxyl-terminated (meth)acrylic polymer obtained by the method according to claim 1.

12. A curable composition which comprises two components: (A) a hydroxyl-terminated (meth)acrylic polymer; and (B) a compound having at least two functional groups each capable of reacting with a hydroxyl group.

13. The curable composition according to claim 12, wherein the compound having at least two functional groups each capable of reacting with a hydroxyl group is a polyisocyanate compound.

14. The curable composition according to claim 12, wherein the hydroxyl-terminated (meth)acrylic polymer has number average molecular weight within the range of 500 to 50,000.

15. A method for producing an alkenyl-terminated (meth)acrylic polymer which comprises converting the terminal hydroxyl group of the hydroxyl-terminated (meth)acrylic polymer obtained by the method according to claim 1, into an alkenyl-containing substituent.

16. A curable composition which comprises two components: (C) the alkenyl-terminated (meth)acrylic polymer obtained by the method of claim 15; and (D) a hydrosilyl-containing compound.

17. A method for producing a crosslinkable silyl-terminated (meth)acrylic polymer which comprises subjecting the alkenyl-terminated (meth)acrylic polymer obtained by the method of claim 15 to addition reaction with a crosslinkable silyl-containing hydrosilane compound.

18. A method for producing a crosslinkable silyl-terminated (meth)acrylic polymer which comprises reacting the hydroxyl-terminated (meth)acrylic polymer obtained by the method according to claim 1, with a compound containing a crosslinkable silyl group and a functional group reactive with the hydroxyl group.

19. The method according to claim 18, wherein the functional group reactive with a hydroxyl group is a isocyanato group.

20. A curable composition which comprises the crosslinkable silyl-containing (meth)acrylic polymer obtained by the method according to claim 17.

21. A curable composition comprising two components: (A) a hydroxyl-terminated (meth)acrylic polymer; and (B) a compound having at least two function groups each capable of reacting with a hydroxyl group, wherein said hydroxyl-terminated (meth)acrylic polymer is obtained by the method of claim 1.

* * * * *